United States Patent

Williams et al.

[11] Patent Number: 4,498,839
[45] Date of Patent: Feb. 12, 1985

[54] TRACTOR FRONT LOADERS

[75] Inventors: Frederick Williams, Warrington; Anthony D. Coe, Manchester, both of England

[73] Assignee: David Brown Tractors Ltd., Huddersfield, England

[21] Appl. No.: 502,051

[22] Filed: Jun. 7, 1983

[30] Foreign Application Priority Data

Jun. 17, 1982 [GB] United Kingdom ................. 8217601

[51] Int. Cl.³ .............................................. B66C 23/00
[52] U.S. Cl. ..................................... 414/686; 172/273
[58] Field of Search ........................ 414/686, 694, 723; 403/161, 162, DIG. 7, 409, 351, 154; 172/272, 273, 274, 275

[56] References Cited

U.S. PATENT DOCUMENTS

| | | | |
|---|---|---|---|
| 4,318,662 | 3/1982 | Erickson et al. | 414/686 |
| 4,345,870 | 8/1982 | Anderson et al. | 172/274 X |
| 4,383,793 | 5/1983 | Weir | 403/161 X |
| 4,420,272 | 12/1983 | Ingalls et al. | 403/162 X |

Primary Examiner—Joseph E. Valenza
Assistant Examiner—Dennis Williamson

[57] ABSTRACT

Tractor front loaders of drive-in type have brackets fixed to a tractor and engageable with a detachable sub-frame carrying a boom assembly mounting a bucket. The sub-frame is secured to the brackets by close-fitting pins causing removal difficulties, or loose-fitting pins causing loader instability and accelerated pin wear. Easy-release pins are therefore provided, each passing with substantial radial clearance through aligned axially-spaced holes in one bracket and fitting, between the holes, in an eccentric bush which fits in a boss fixed to the subframe and is rotatable by a handle into an operative position in which the pin establishes contact with one side of the holes and the boss establishes clamping contact with a cam-plate fixed to the bracket, or into an easy-release position in which the contacts are disestablished.

9 Claims, 6 Drawing Figures

TRACTOR FRONT LOADERS

BACKGROUND OF INVENTION

The invention relates to a tractor front loader, and more particularly to a front loader designed for drive-in attachment to a tractor, that is to say to a front loader having brackets adapted to be permanently secured to a tractor and engageable with a detachable main portion of the loader which is adapted to be supported when not in use at the required height for drive-in attachment.

The detachable portion is secured to the brackets by attachment pins which hitherto have either been made a close fit in their associated holes resulting in their being extremely difficult to remove; or alternatively been made a loose fit therein causing the detachable portion to be loosely attached and the loader consequently to be unstable in operation, its instability becoming even worse as accelerated wear of said pins and holes occurs due to their loose fit. The object of the invention is to facilitate the release of the detachable portion of the loader without causing any such loose attachment and instability, and to provide means for taking up wear of the attachment pins and their associated components.

SUMMARY OF INVENTION

According to the invention, a front loader designed for drive-in attachment to a tractor, comprising front and rear bracket means adapted to be permanently secured to the tractor frame, a sub-frame adapted to be temporarily secured to the bracket means, a loader boom assembly pivotably mounted on the sub-frame, a loader bucket or the like pivotably mounted on the boom assembly, and hydraulic piston-and-cylinder assemblies for selectively pivoting the boom assembly and the bucket, wherein the sub-frame locates on the front bracket means and is secured to the rear bracket means by respective easy-release pins each of which passes with substantial radial clearance through aligned axially-spaced holes in one rear bracket and fits, between said holes, in an eccentric bush which fits in a boss fixed to the sub-frame and is rotatable into an operative position in which the pin establishes contact with one side of said holes and the boss establishes contact with a cam-plate fixed to the rear bracket, or into an easy-release position in which said contacts are disestablished.

BRIEF DESCRIPTION OF DRAWINGS

A preferred embodiment of the invention will now be described, by way of example only, with reference to the accompanying drawings of which.

DESCRIPTION OF PREFERRED EMBODIMENT

Figure 1:
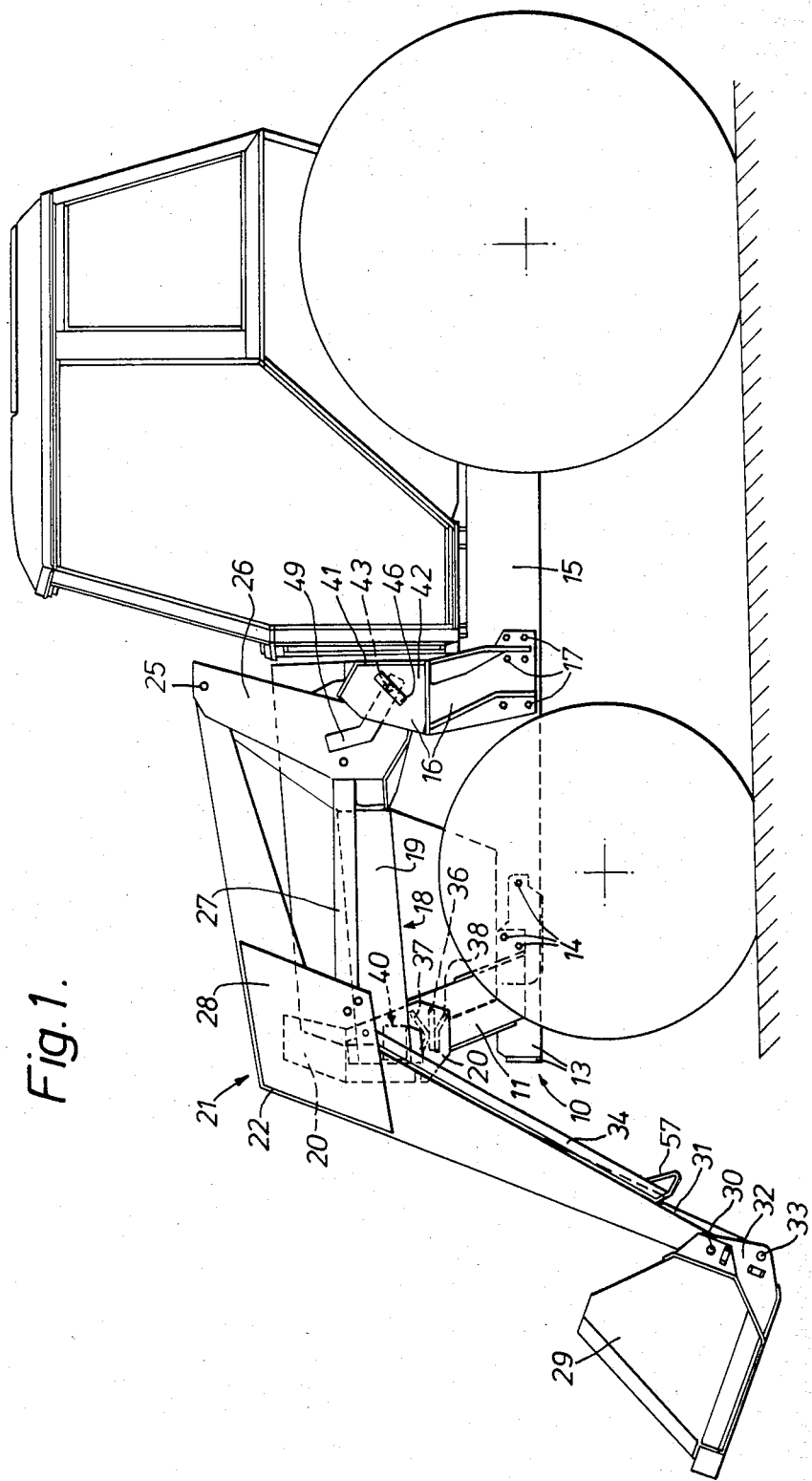
FIG. 1 is a side elevation of a tractor having attached to it a front loader designed for drive-in attachment thereto.
Figure 2:
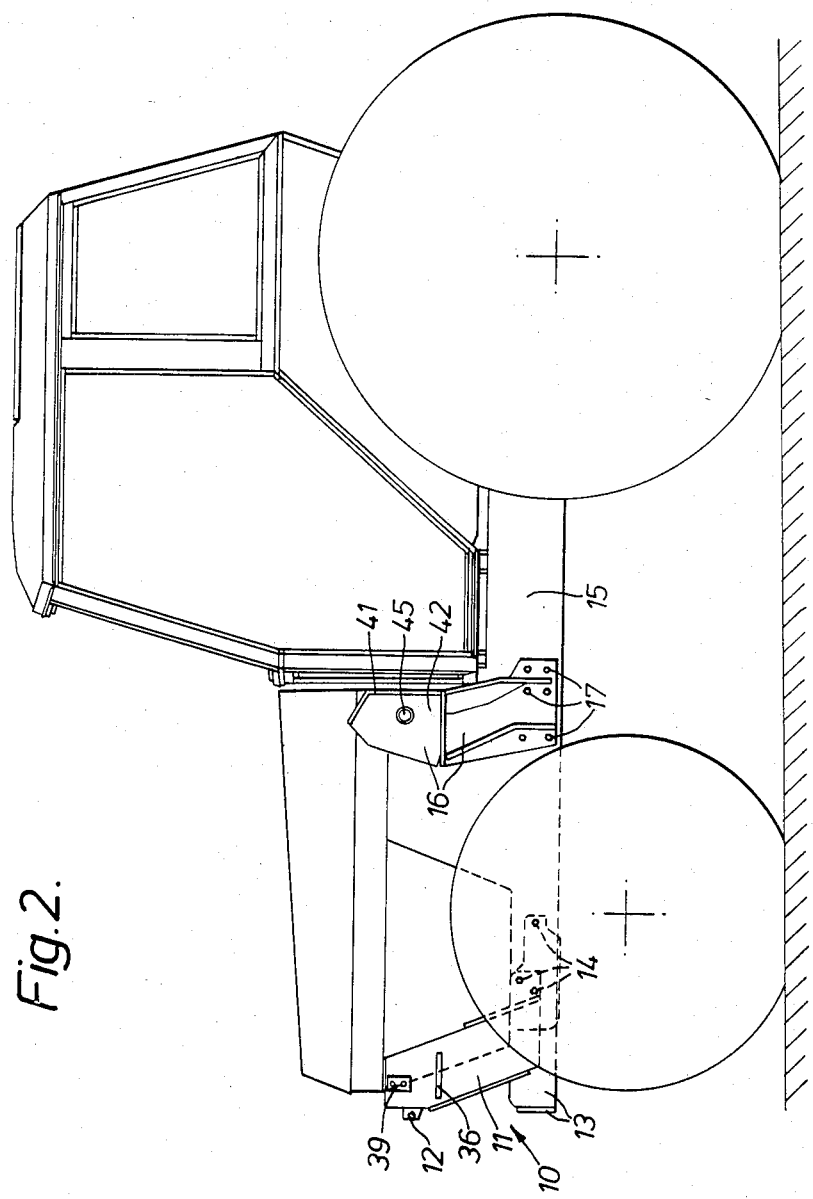
FIG. 2 is a side elevation of the tractor with the detachable main portion of the loader removed, showing the loader attachment brackets permanently secured to the tractor.
Figure 3:
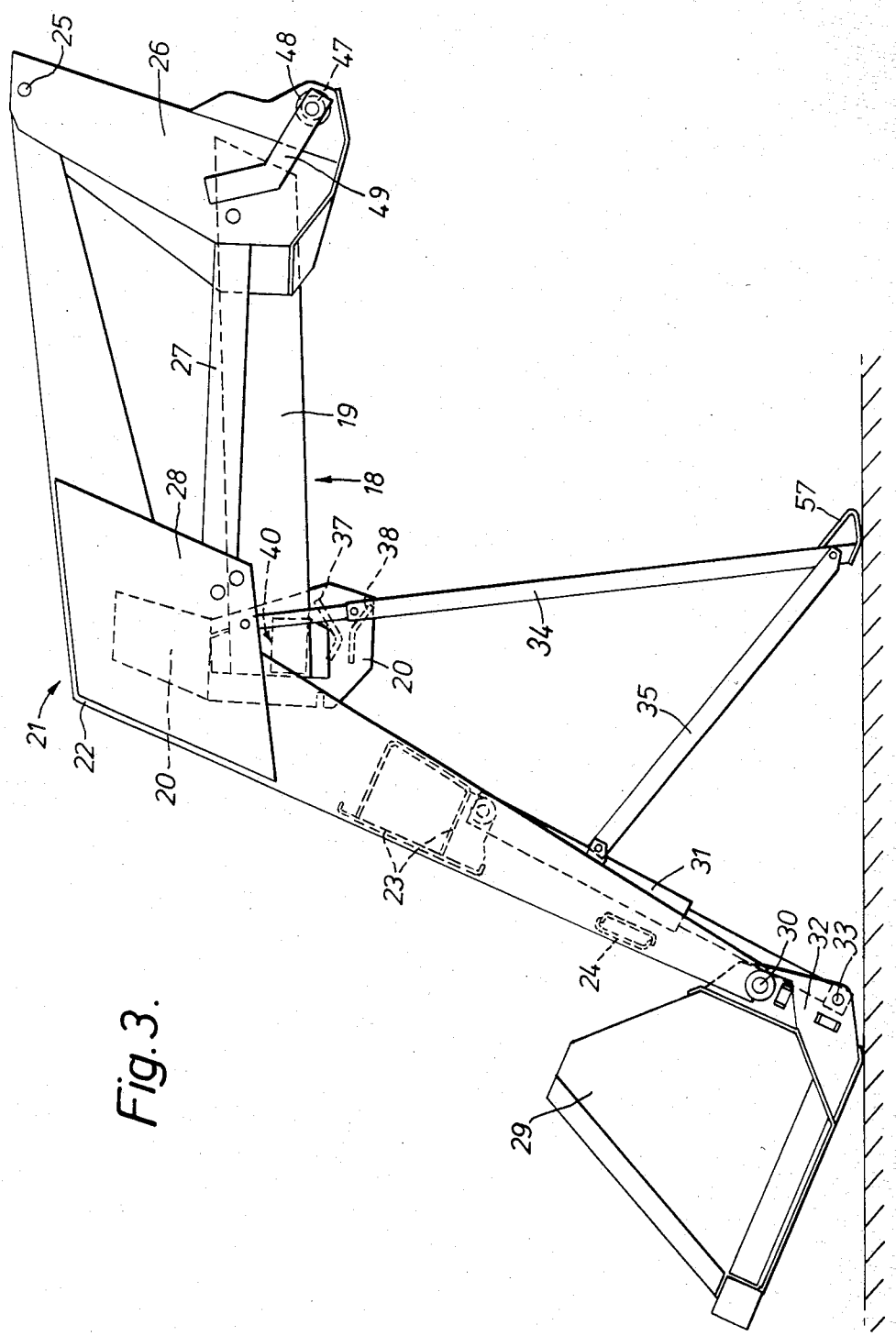
FIG. 3 is a side elevation of te detachable main portion of the loader standing alone.

Referring now to FIGS. 1 to 3 of the drawings, a front loader designed for drive-in attachment to a tractor includes a front attaachment bracket indicated generally at 10 comprising two side plates 11 interconnected near their upper ends by a transverse bar 12 and welded at their lower ends to a basically U-shaped ballast-weight carrier 13 the arms of which are adapted to be permanently secured by set-screws 14 near the front of the tractor frame 15 at each side thereof; and two rear attachment brackets 16 adapted to be permanently secured by set-screws 17 near the mid-point of the length of the tractor frame 15 at each side thereof.

A detachable main portion of the loader includes a sub-frame indicated generally at 18 adapted to be temporarily secured to the brackets 10 and 16 which is substantially U-shaped in plan view and comprises two elongated side members 19 interconnected at their front ends by a radiator guard 20. A loader boom assembly indicated generally at 21 comprising two parallel booms 22 of shallow inverted V-shape interconnected between their apices and front ends by two cross-members 23 and 24 has the rear ends of its booms 22 pivotably mounted about a common transverse axis 25 on the upper ends of respective pedestals 26 secured by welding to the rear ends of the side members 19 of the sub-frame 18, and the boom assembly 21 is pivotable relative to the sub-frame 18 by two hydraulic piston-and-cylinder assemblies 27 each of which is pivotally connected between the lower end of one of the pedestals 26 and a stiffening plate 28 welded to the apex of the associated boom 22. A loader bucket 29, or a similar tool such as a manure fork, is pivotably mounted about a common transverse axis 30 on the front ends of the booms 22, and is pivotable relative to the boom assembly 21 by two hydraulic piston-and-cylinder assemblies 31 each of which is pivotally connected between the rearmost cross-member 23 and a hole in a lug 32 near one side of the bucket 29, the common axis 33 of the holes in the lugs 32 being spaced from but parallel to the pivot axis 30 of the bucket 29. A telescopic strut 34 having a foot 57 is pivotably mounted on each stiffening plate 28 so as to be moveable manually between a stowed retracted position (See FIG. 1) contiguous with the forward part of the associated boom 22; a first deployed extended position (See FIG. 3) in which it is locked at an angle of, say, 40° to said part of said boom by a pivotable auxiliary strut 35 in order to support the rear end of the detachable main portion of the loader, when said portion is not in use, at the required height for drive-in attachment to the front and rear brackets 10 and 16, the front end of said portion being supported by the lowered bucket 29; and a second deployed extended position (not shown) in which it is secured alongside the associated hydraulic piston-and-cylinder assembly 27 with its foot 57 engaging in a recess at the lower front corner of the associated pedestal 26 in order to lock the boom assembly 21 mechanically in its fully raised position whilst the detachable main portion of the loader is attached to the tractor.

The sub-frame 18 locates on the front bracket 10 by means of two horizontal ribs 36 fixed to and projecting laterally outwards from the respective side plates 11 and each engageable between upper and lower forwardly converging guides 37 and 38 respectively which are fixed to and project laterally inwards from the adjacent side of the radiator guard 20, and also by means of two wedges 39 secured to and projecting laterally outwards from the respective side plates 11 and each engageable with one of two mutually forwardly converging plates 40 secured to and projecting laterally inwards from the respective sides of the radiator guard 20. Either the wedges 39 or the plates 40 are made adjustable in a fore-and-aft direction.

Figure 4:
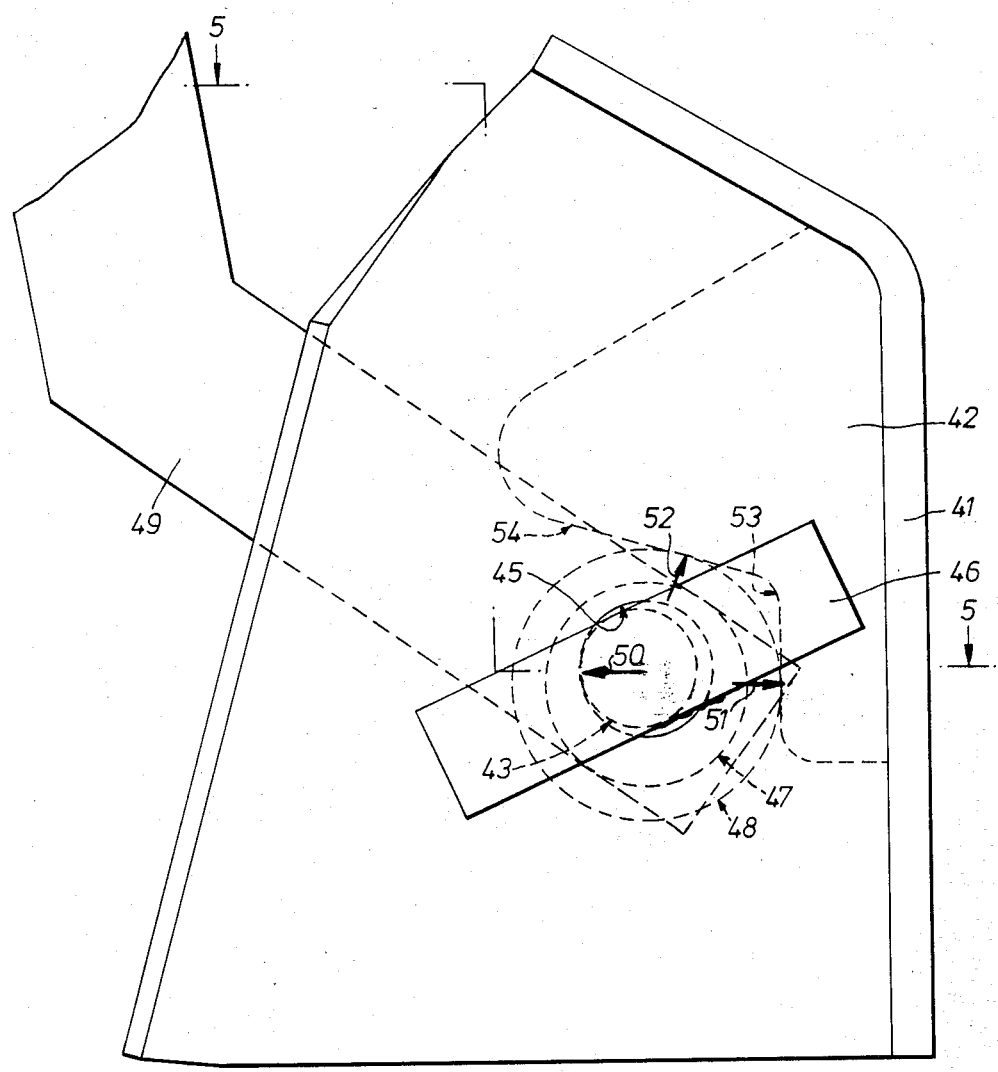
FIG. 4 is a side elevation on a larger scale of the upper part of a rear attachment bracket with an attachment pin clamped in operative position.
Figure 5:
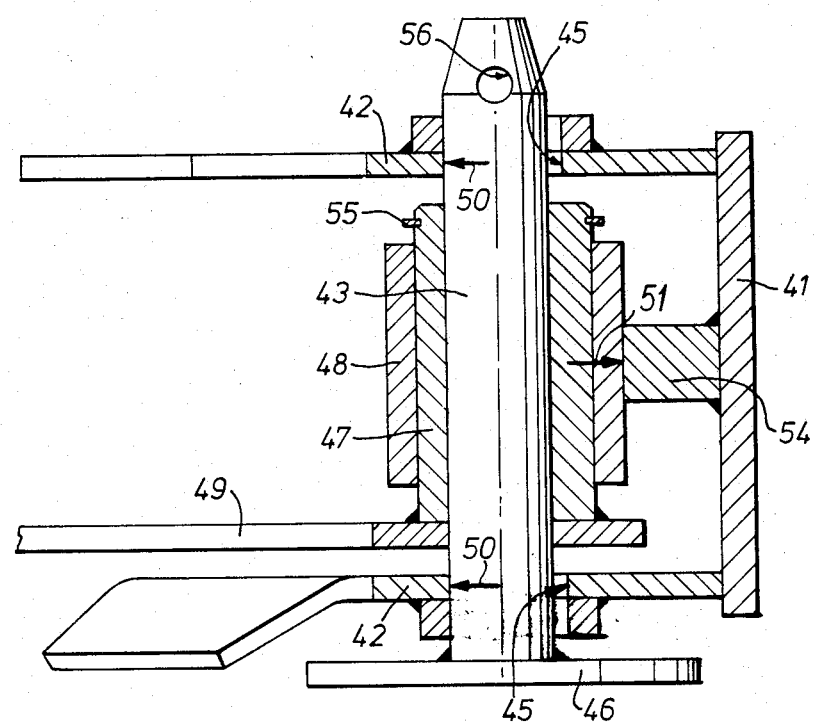
FIG. 5 is a section on an intermediate scale on the line 5—5 in FIG. 4.
Figure 6:
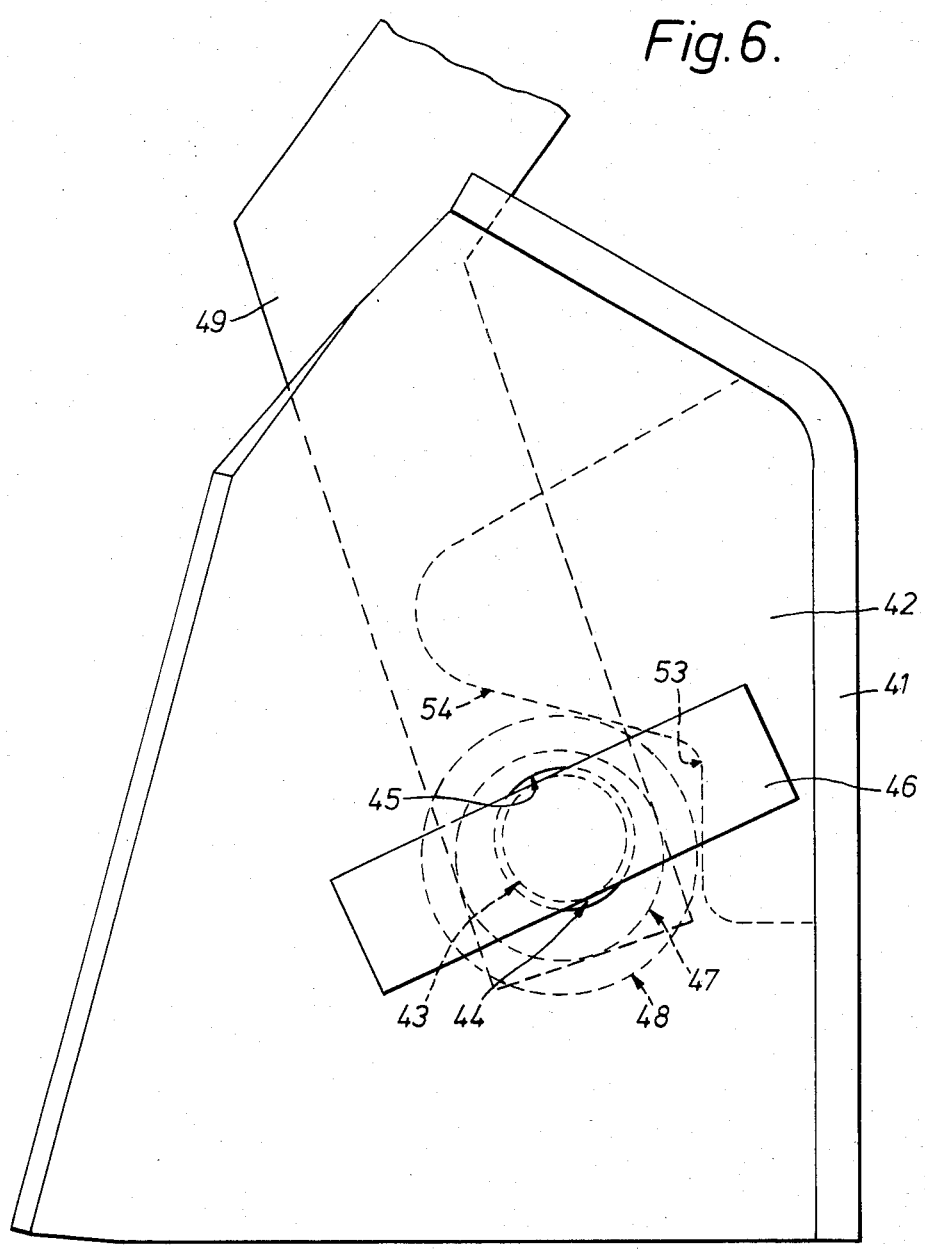
FIG. 6 is a side elevation corresponding to FIG. 4 with the pin unclamped for easy withdrawal.

Referring now to FIGS. 4 to 6 of the drawings, the upper part of each rear bracket 16 is substantially U-shaped in plan view, with a rear wall 41 and two mainly parallel side walls 42, and the lower rear corner of each pedestal 26 of the sub-frame 18 is secured within the upper part of the associated rear bracket 16 by an easy-release attachment pin 43 which passes with substantial radial clearance 44 through aligned holes 45 in the side walls 42 of the upper part of the bracket 16. The pin 43 has a hand-grip 46 welded to its end remote from the tractor and fits, between the holes 45, in an eccentric bush 47 which fits in a boss 48 fixed to the lower rear corner of the pedestal 26. The bush 47 is readily rotateable manually, by means of a handle 49 comprising a radial arm welded to its end remote from the tractor, into an operative position (See FIGS. 4 and 5) in which the pin 43 establishes contact at the points indicated by the arrows 50 with the front sides of the holes 45 and the boss 48 establishes clamping contact at the points indicated by the arrows 51 and 52 with both sides of a notch 53 in a cam-plate 54 welded to the rear wall 41 of the upper part of the bracket 16, or into an easy-release position (See FIG. 6) in which said contacts are disestablished and the pin 43 can be freely withdrawn. When the bush 47 is in its operative position the arrangement is self-tightening, the weight and angular disposition of the handle 49 ensuring that contact is constantly maintained at the points indicated by the arrows 50, 51 and 52. Furthermore, any wear of the pin 43 and its associated components 45, 47, 48 and 53 is automatically taken up by the weight of the handle 49 moving the bush 47 angularly and thereby causing the points of contact indicated by the arrows 50 to be gradually relocated in an anti-clockwise direction as seen in FIG. 4. The bush is retained in the boss 48, to prevent its being dislodged whilst the main portion of the loader is not attached to the tractor, by a circlip 55 disposed at the opposite end of the bush 47 to the handle 49 thereon. The pin 43 is provided, near the opposite end to its hand-grip 46, with a diametrical hole 56 for the reception of a linch-pin (not shown) to retain the pin 43 in the holes 45.

We claim:

1. A front loader designed for drive-in attachment to a tractor, comprising front and rear bracket means adapted to be permanently secured to the tractor frame, a sub-frame adapted to be temporarily secured to the bracket means, a loader boom assembly pivotably mounted on the sub-frame, a loader bucket or the like pivotably mounted on the boom assembly, and hydraulic piston-and-cylinder assemblies for selectively pivoting the boom assembly and the bucket, wherein the sub-frame locates on the front bracket means and is secured to the rear bracket means by respective easy-release pins each of which passes with substantial radial clearance through aligned axially-spaced holes in one rear bracket and fits, between said holes, in an eccentric bush which fits in a boss fixed to the sub-frame and is rotateable into an operative position in which the pin establishes contact with one side of said holes and the boss establishes contact with a cam-plate fixed to the rear bracket, or into an easy release position in which said contacts are disestablished.

2. A front loader according to claim 1, wherein the cam-plate is provided with a notch so that in the operative position of the bush the boss contacts both sides of said notch.

3. A front loader according to claim 1 or claim 2, wherein the bush is rotateable by means of an arm fixed to it.

4. A front loader according to claim 3, wherein the weight and angular disposition of the arm have a self-tightening action, and take up any wear of the pin and its associated components, when the bush is in its operative position.

5. A front loader according to claim 1, claim 2, claim 3 or claim 4, wherein the sub-frame locates on the front bracket means by means of two horizontal ribs fixed to and projecting laterally outwards from the respective sides of the front bracket means and each engageable between upper and lower forwardly converging guides fixed to and projecting laterally inwards from the adjacent side of the sub-frame near its front end, and also by means of two wedges secured to and projecting laterally outwards from the respective sides of the front bracket means and each engageable with one of two mutually forwardly converging plates secured to and projecting laterally inwards from the respective sides of the sub-frame near its front end.

6. A front loader according to claim 5, wherein the wedges are adjustable relative to the front bracket means in a fore-and-aft direction.

7. A front loader according to claim 5, wherein the mutually forwardly converging plates are adjustable relative to the sub-frame in a fore-and-aft direction.

8. A front loader according to claim 1, claim 2, claim 3, claim 4, claim 5, claim 6 or claim 7, wherein two struts are pivotable on respective sides of the boom assembly between stowed positions adjacent said assembly and deployed positions in which they are locked at an angle to said assembly in order to support the sub-frame at drive-in height when it is not attached to the tractor.

9. A front loader according to claim 8, wherein the struts are pivotable into second deployed positions in which they are secured adjacent the hydraulic piston-and-cylinder assemblies for pivoting the boom assembly and in engagement with the sub-frame in order to lock the boom assembly in its fully raised position whilst the sub-frame is attached to the tractor.

* * * * *